(12) United States Patent
McElvenny

(10) Patent No.: US 8,440,087 B2
(45) Date of Patent: May 14, 2013

(54) THICKENERS HAVING SELF-DILUTING FEEDWELL

(75) Inventor: Rhett McElvenny, Sylvania Heights (AU)

(73) Assignee: Delkor Pty., Ltd, St. Peters, New South Wales (AU)

( * ) Notice: Subject to any disclaimer, the term of this patent is extended or adjusted under 35 U.S.C. 154(b) by 352 days.

(21) Appl. No.: 12/745,891

(22) PCT Filed: Dec. 2, 2008

(86) PCT No.: PCT/AU2008/001782
§ 371 (c)(1),
(2), (4) Date: Jul. 28, 2010

(87) PCT Pub. No.: WO2009/070831
PCT Pub. Date: Jun. 11, 2009

(65) Prior Publication Data
US 2010/0300546 A1    Dec. 2, 2010

(30) Foreign Application Priority Data
Dec. 4, 2007 (AU) .................................. 2007906583

(51) Int. Cl.
C02F 1/52       (2006.01)
B01D 21/02      (2006.01)
B01D 35/12      (2006.01)

(52) U.S. Cl.
USPC ........... 210/712; 210/805; 210/800; 210/540; 210/532.1; 210/519

(58) Field of Classification Search .................. 210/519, 210/712, 532.1, 540, 207, 194, 800, 805
See application file for complete search history.

(56) References Cited

U.S. PATENT DOCUMENTS

| | | | |
|---|---|---|---|
| 2,946,448 A | 7/1960 | Peterson | 210/331 |
| 3,532,218 A * | 10/1970 | Dykhouse et al. | 210/207 |
| 5,015,392 A | 5/1991 | Taylor | 210/172 |
| 5,147,556 A | 9/1992 | Taylor | 210/712 |
| 5,389,250 A | 2/1995 | Wood | 210/194 |
| 7,591,946 B2 * | 9/2009 | Taylor | 210/208 |
| 7,988,865 B2 * | 8/2011 | Laros et al. | 210/712 |
| 8,123,955 B2 * | 2/2012 | Lake et al. | 210/712 |

* cited by examiner

Primary Examiner — Bobby Ramdhanie
Assistant Examiner — Nader Hossaini
(74) Attorney, Agent, or Firm — Adams & Adams

(57) ABSTRACT

A thickening tank has a peripheral overflow launder and a centrally disposed feed well. Feedstock slurry is fed to a mixing box which also receives supernatant liquid and is supplemented by flocculated material flowing into the interior of the feed well onto a distributor baffle plate. The supernatant liquid is delivered at a controlled rate from a receiving vessel formed by an upright cylinder provided at its lower end with an impeller of a lift pump which is operated by a controller positioned at the upper end of a vertical drive shaft extending axially through the receiving vessel. The feed well is surrounded by a second launder which is closed at its base and formed with a cup. The lower end of the receiving vessel is spaced from the floor of the cup to draw supernatant liquid exclusively from the second launder rather than from the thickener tank.

11 Claims, 2 Drawing Sheets

THICKENERS HAVING SELF-DILUTING FEEDWELL

CROSS-REFERENCE TO RELATED APPLICATIONS

This application claims priority on PCT Patent Application No. PCT/AU2008/001782, filed Dec. 2, 2008, in which the United States of America was a Designated State.

FIELD OF THE INVENTION

This invention relates to a method and apparatus for the dilution of a thickener feed to a thickener tank and is concerned, although not exclusively so, with industries in which liquid is separated from solids in suspended pulps. One such industry occurs in the field of mineral extraction and mineral processing. Another such industry occurs in the operation of clarifiers used in the treatment of sewage. For convenience the invention will hereinafter be described with reference to the extraction of mineral ore from a feedstock slurry but it is to be understood that the invention is also applicable to other industries where thickening of a feedstock is required.

BACKGROUND OF THE INVENTION

A typical thickener takes the form of an upright cylindrical tank having a feed well situated concentrically within it. Feedstock in the form of a slurry is introduced into the feed well by way of a feed channel. A controlled amount of supernatant liquid is also introduced into the feed well to dilute the feedstock if required. During operation of the thickener tank, a flocculent is introduced into the diluted feedstock to enhance settling of the mineral ore in the tank, so that solids settle to a compaction zone towards the bottom of the tank and flocculated material settles in a hindered settling zone which forms above the compaction zone. Supernatant liquid accumulates in the tank above the hindered settling zone and is removed by way of an overflow launder which encircles an upper portion of the tank.

The floor of the tank is of frusto-conical shape and slopes downwardly towards a centrally-located underflow outlet. Solids collecting on the floor of the tank are raked gently towards the outlet and are removed through it.

The use of flocculants will, in many cases, greatly enhance the settling rates of the solids through the tank. This allows the tank size for a given installation to be reduced. The process of flocculation may also often be improved by dilution of the feedstock. However as the feedstock density is generally determined by processes occurring upstream of the thickening tank, several techniques have been developed to dilute the feedstock by transferring back into it some of the supernatant liquid collected in the upper portion of the tank or in the overflow launder.

One such technique involves the use of the difference in densities of the liquid in the thickener tank, and the feedstock in the feed well. The transfer of liquid from the tank to the feed well then takes place by gravity Another technique involves pumping supernatant liquid collected in the peripheral overflow launder encircling the upper portion of the thickener tank, back into the stream of feed slurry flowing towards the tank.

Yet a third technique is to pump supernatant liquid from the thickener tank back into the stream of feed slurry flowing towards the tank.

Each of the above techniques proposed or used in the prior art has attendant disadvantages. The use of gravity and differential densities, although simple, lacks good control. This technique also is dependant upon the prevailing operating conditions of the installation and often mitigates against the transfer of large volumes of supernatant liquid from the thickener tank to the stream of feed slurry flowing towards it. The technique involving the pumping of dilution liquid collected in the peripheral overflow launder surrounding the tank, involves additional expense. This results from the increased constructional costs associated with the provision of a larger tank together with additional pipe work extending between the launder and the feed well. Finally the technique of submerging or partly-submerging pumping apparatus inside the thickening tank in one or more positions can disrupt the smooth flow of liquid through the tank and traveling radially outwards towards the overflow launder. This follows from the risk of occurrence of changing, highly localized, rising flow rates occurring inside regions of the tank. These can adversely affect the clarity of the supernatant liquid entering the overflow launder with consequential operational problems caused by the changing liquid flow patterns inside the tank with different levels of operation of the pumping apparatus. For instance, the location of the pumping apparatus above the hindered settling zone will result in the smooth, radially-outward flow of supernatant liquid towards the launder being disrupted by regions of upward suction of the supernatant liquid, which occur beneath the locations of the pumping apparatus. Such disruption can result in a thick and even layer of flocculated material residing in the hindered settling zone being partially broken up and, as a consequence, some of the flocculated material being carried with the supernatant liquid into the overflow launder to adversely affect its clarity as well as the efficient working of the thickening tank through regions of depletion of the flocculated layer in the hindered settling zone.

SUMMARY OF THE INVENTION

It is an object of this invention to provide a way of operating a thickening tank so as to reduce or avoid the disadvantages referred to above.

In a first aspect of the invention there is provided a thickening tank having an overflow launder and a feed well provided with a second launder, and means for transferring supernatant liquid at a controlled rate exclusively from the second launder to a slurry feedstock supplied to the feed well.

In a second aspect of the invention there is provided a method of operating a thickener tank, comprising introducing into a feed well in the central region of the tank a feedstock containing a flocculated material and diluted with supernatant liquid drawn off from the tank, forming a compaction zone in the lower portion of the tank, progressively removing particulate solid material from the compaction zone through a bottom outlet to the tank, forming a hindered settling zone from the flocculated material above the compaction zone and in an intermediate portion of the tank, collecting supernatant liquid in an upper zone of the tank above the hindered settling zone, producing a flow of supernatant liquid in the upper zone of the tank and which has a symmetrical and generally frusto-conical flow pattern leading outwardly and upwardly towards a peripheral overflow launder positioned at the surface of the supernatant liquid around the upper zone of the tank, supplying a feedstock slurry to a feed well positioned centrally in the upper zone of the tank and having a surrounding second launder beneath the level of the overflow launder and into which supernatant liquid flows from the tank in a direction which is radially inwards of the second launder, supplying a receiving vessel with supernatant liquid withdrawn exclusively from the second launder, and pumping supernatant liquid at a required controlled rate from the receiving vessel to effect dilution of the feedstock In a third aspect of the invention there is provided a thickening tank having a feed well in the central region of its upper portion, an overflow launder arranged around the periphery of the upper portion of the tank and into which supernatant liquid can flow in a generally frusto-conical and radially outwards direction in the upper portion of the tank, means for delivering a mixture of flocculated material and feedstock to the feed well, a second launder surrounding the feed well and into which supernatant liquid from the upper portion of the tank can flow, a receiving vessel arranged to receive supernatant liquid exclusively from the second launder, a lift pump in the receiving vessel arranged to transfer supernatant liquid at a controlled rate from the second launder to feed stock entering or present in the feed well.

In a fourth aspect of the invention there is provided a feed well for fitting to a thickening tank provided with a peripheral overflow launder and comprising: a cylindrical casing open at its underside for discharging diluted feedstock downwardly towards a baffle plate spaced beneath the feed well, a second launder attached to the outside of the feed well and having its underside closed, a cup formed in the underside of the second launder and containing the lower end of a receiving vessel containing a lift pump which operates by drawing supernatant liquid exclusively from the second launder by way of the receiving vessel, and means for operating the pump in a controlled manner to pump supernatant liquid the receiving vessel to feedstock supplied to it.

The invention enables a substantial saving in the cost of flocculent per ton of solids in the feed stock, to be achieved. Furthermore, the use of the second launder enables an improved flow pattern of liquid inside the tank to be obtained. Finally a reduction in the cost of consumables is obtainable. These advantages follow from the fact that when supernatant liquid required for diluting the feedstock is drawn directly by a receiving vessel from the interior of the tank in the vicinity of the feed well, an upward flow of the supernatant liquid occurs inside the tank. Localized disturbance of the bed of flocculated material results from this upward flow, and flocculated material is then entrained in the supernatant liquid flowing towards the overflow launder. The risk of disturbance of the bed of flocculated material is much reduced when the supernatant liquid for diluting the feedstock is obtained from the second launder rather than from the thickening tank itself.

These and other objects, features and advantages are accomplished according to the instant invention by providing a thickening tank having a peripheral overflow launder and a centrally disposed feed well. Feedstock slurry is fed through a duct to a mixing box which also receives a controlled flow of supernatant liquid from a side opening. The mixture from the box supplemented by flocculated material flows into the interior of the feed well by way of a pipe and discharges downwardly from the bottom and onto a distributor baffle plate. The supernatant liquid admitted through the side opening is delivered at a controlled rate from a receiving vessel. This is formed by an upright cylinder provided at its lower end with an impeller of a lift pump which is operated at a controlled rate by a controller positioned at the upper end of a vertical drive shaft extending axially through the receiving vessel. The feed well is surrounded by a second launder which is closed at its base and is formed in the base with a cup. The lower end of the receiving vessel is spaced from the floor of the cup so that it draws supernatant liquid exclusively from the second launder rather than from the interior of the thickener tank. Undesirable changing current flows in the tank are thus avoided when the rate of delivery of supernatant liquid to the mixing box is changed by the controller.

BRIEF DESCRIPTION OF THE DRAWINGS

The invention will now be described in more detail, by way of example, with reference to the accompanying largely diagrammatic and greatly simplified drawings, in which.

DETAILED DESCRIPTION OF THE PREFERRED EMBODIMENT

Figure 1:
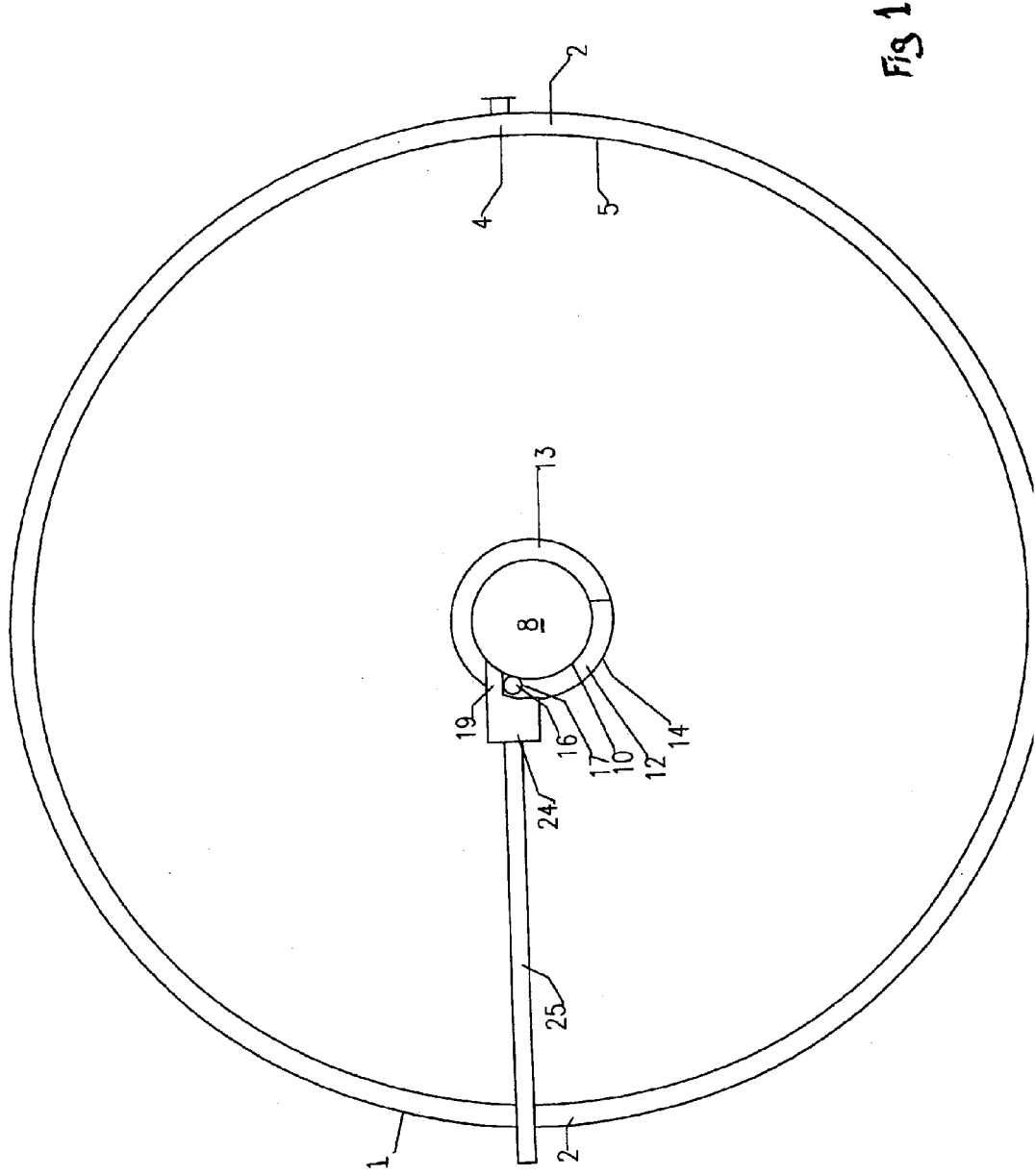
FIG. 1 is a plan view of a thickening tank.

FIG. 1 shows an upright cylindrical thickening tank 1 having a peripheral overflow launder 2 extending around the inside of an upper portion 3 of the tank. The launder is closed at its base 4 and it has an inner cylindrical wall 5. Supernatant liquid from the upper portion 3 of the tank 1 flows symmetrically in a radially outwards direction into the launder 2.

A feed well shown generally at 8 is mounted in the central region of the upper portion 3 of the thickener tank 1 and comprises a cylindrical casing 10 open at its underside 11 and surrounded by a second launder 12 arranged slightly beneath the level of the overflow launder 2. The second launder has its base 13 closed and its external wall 14 is formed with a V-notch weir 15 or horizontal wet edge which allows supernatant liquid to enter the launder. The second launder may be formed with circumferentially-spaced parts (not shown) which are individually vertically adjustable in a controlled manner to ensure a smooth and even flow of liquid into the launder from the tank.

The base 13 of the second launder 12 is formed with one or more circumferentially spaced cups 16. Each cup 16 contains the lower end of a receiving vessel 17 which is in the form of an upright cylinder having its lower end spaced from the floor of the cup 16. An impeller 20 rotated by a drive shaft 21 extends coaxially upwards through the receiving vessel 17 to a controller 22 at its upper end. An upper, side opening 23 in the receiving vessel 17 receives supernatant liquid pumped upwardly by the impeller 20. The supernatant liquid flows out of the receiving vessel 17 in a lateral direction and into a mixing box 24 which opens into the upper interior of the feed well 8 through a pipe 19.

A feedstock delivery channel 25 slopes downwardly into the mixing box 24 and discharges feedstock slurry into it where it is diluted by supernatant liquid added in a controlled manner by operation of the impeller 20. The parts of the receiving vessel are so arranged that there is no back flow into it of solid material from the mixing box if the impeller is not operating.

A conical baffle plate 26 is spaced beneath the lower end of the feed well 8. The purpose of the baffle plate is to deflect diluted slurry flowing from the underside of the feed well 8 into the form of a circular curtain of particulate material which descends slowly through a bed of flocculated material established in a hindered settling zone 29, and collects in a compaction zone 28 formed on a conical base 30 of the thickener tank 1. A rake 31 sweeps slowly around the conical base 30 to move particulate material from the underside of the compaction zone 28 towards a central outlet 32 from which it is discharged in a thickened form.

Operation of the Preferred Embodiment

Figure 2:
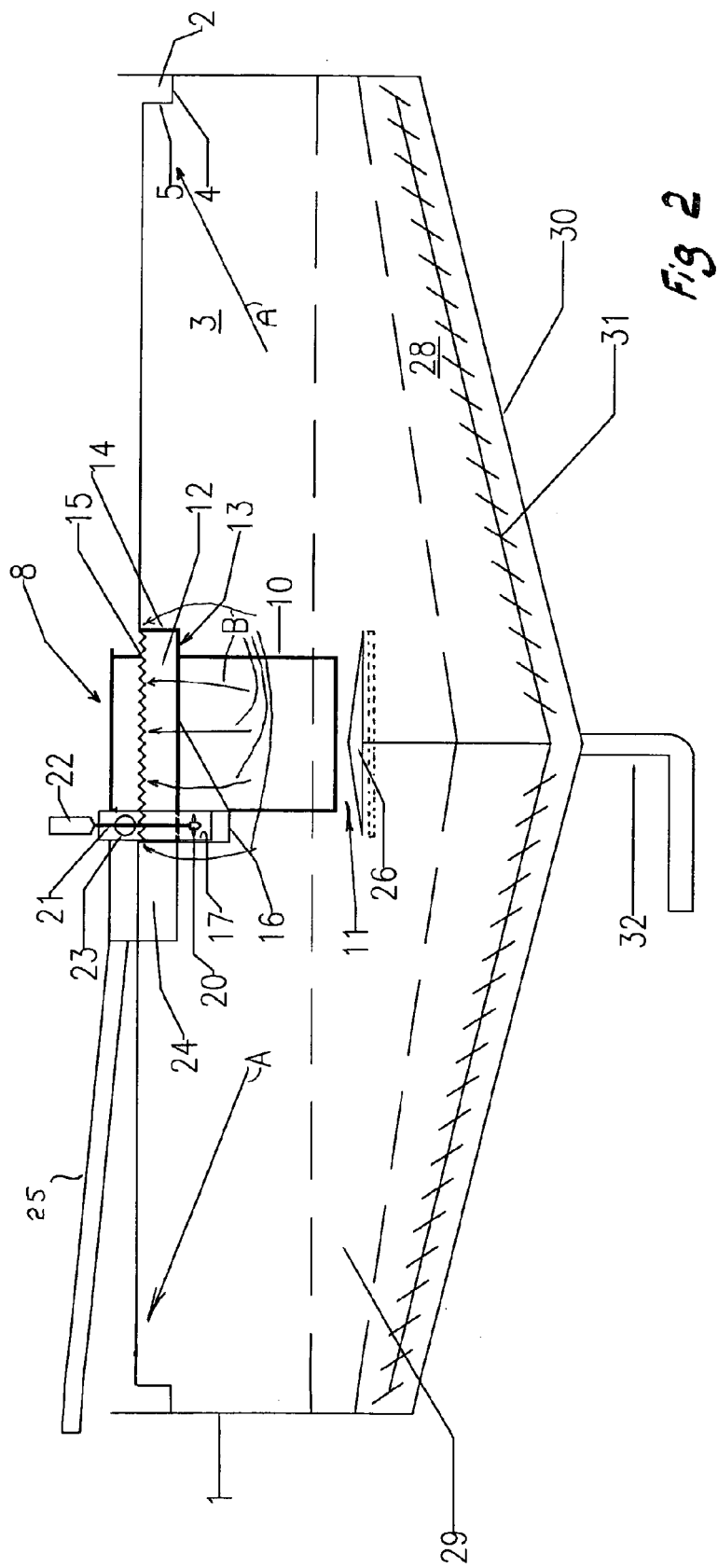
FIG. 2 is a vertical section through the thickening tank of FIG. 1 and shows the flows of supernatant liquid by way of arrows, and, in broken outline, a modification of a baffle plate used in the tank.

Flocculated material discharged from the bottom of the feed well 8 permeates through the hindered settling zone 29 which is a thick bed disposed immediately above the compaction zone 28. It is of importance that flocculated material in the settling zone is disturbed as little as possible so that it is not entrained in the current of supernatant liquid flowing radially outwardly and upwardly towards the overflow launder 2. Such a current 20 is depicted in FIG. 2 by the arrows "A". An undesirable disturbance of the flocculated bed beneath the feed well 8 is likely to occur if there is a localized upward movement of supernatant liquid in the tank such as would occur were the receiving vessel to withdraw the liquid directly from the tank itself rather than exclusively from the second launder.

The arrows depicted at "B" in FIG. 2 shows the flows of supernatant around the feed well 8 to the level of the V-notch weir or horizontal wet edge 15 of the second launder. These flows B are influenced symmetrically by the operation of the impeller in the receiving vessel because the upward flow of supernatant liquid extends along a broad generally annular path surrounding the feed well and leading to the peripheral edge of the second launder and not, as is the case with some of the prior art, converging on a point on the receiving vessel from which the liquid is actually extracted directly from the thickener tank.

When the thickening tank is operating, the physical layout of the described parts results in negligible interaction between the liquid flows A and B, and the flows themselves are gentle, thus giving consistent operational parameters not achievable with the prior art Modification of the Embodiment The second launder may be provided with more than one receiving vessel. However it is important that when pumping is occurring, the supernatant liquid used for dilution of the feed stock is drawn exclusively by the receiving vessel from the second launder and not from the interior of the thickening tank.

Although in the embodiment illustrated the second launder is positioned outside the feed well, it may also be positioned inside the feed well so as to line the inside wall of the feed well casing. Openings are then provided in the feed well casing to allow supernatant liquid to enter the launder. The launder, together with its receiving vessel and pump, is so arranged inside the feed well casing that the slurry in the feed well cannot enter the second launder or receiving vessel, even when the impeller is stationary.

The conical baffle plate 26 may be replaced by a flat, circular horizontal baffle plate as shown in broken outline in FIG. 2, if preferred.

Also, the mixing of the drawn-off supernatant liquid with the incoming feedstock may occur in the feed well itself, in the feedstock delivery channel upstream of the mixing box, or in a drop box which takes the place of the mixing box.

Finally operating parameters should be established to ensure that the desired symmetrical flows denoted by the arrows A and B are always maintained during operation of the thickener tank to ensure that there is the minimum loss of entrained solids into the overflow launder and the maximum clarity of supernatant liquid collected in the two launders is maintained.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

The invention claimed is:

1. A thickening tank having an overflow launder and a feed well provided with a second launder; and
    means for transferring supernatant liquid at a controlled rate exclusively from the second launder to a slurry feedstock supplied to the feed well by displacing the supernatant liquid upwardly and out of the second launder to the slurry feedstock.

2. The thickening tank of claim 1, in which the second launder is provided inside the feed well which is formed in its wall with openings through which supernatant liquid from the tank can enter the second launder.

3. The thickening tank of claim 1, in which a feedbox is arranged upstream of the feed well and is connected to receive feed stock slurry and supernatant diluting liquid and to mix them together before supplying the mixture to the feed well.

4. The thickening tank of claim 1, in which dilution of the feedstock with supernatant liquid occurs within the feed well.

5. A method of operating a thickener tank, comprising:
    introducing into a feed well in the central region of the tank a feedstock containing a flocculated material and diluted with supernatant liquid drawn off from the tank;
    forming a compaction zone in the lower portion of the tank;
    progressively removing particulate solid material from the compaction zone through a bottom outlet to the tank;
    forming a hindered settling zone from the flocculated material above the compaction zone and in an intermediate portion of the tank;
    collecting supernatant liquid in an upper zone of the tank above the hindered settling zone;
    producing a flow of supernatant liquid in the upper zone of the tank and which has a symmetrical and generally frusto-conical flow pattern leading outwardly and upwardly towards a peripheral overflow launder positioned at the surface of the supernatant liquid around the upper zone of the tank;
    supplying a feedstock slurry to a feed well positioned centrally in the upper zone of the tank and having a surrounding second launder beneath the level of the overflow launder and into which supernatant liquid flows from the tank in a direction which is radially inwards of the second launder;
    supplying a receiving vessel with supernatant liquid withdrawn exclusively from the second launder; and
    pumping supernatant liquid at a required controlled rate from the receiving vessel to effect dilution of the feedstock.

6. The method of claim 5, in which the feed well extends into the thickening tank above the interface between the hindered settling zone and the layer of supernatant liquid above it.

7. A thickening tank, comprising:
    a feed well in the central region of its upper portion;
    an overflow launder arranged around the periphery of the upper portion of the tank and into which supernatant liquid can flow in a generally frusto-conical and radially outwards direction in the upper portion of the tank;
    means for delivering a mixture of flocculated material and feedstock to the feed well;
    a second launder surrounding the feed well and into which supernatant liquid from the upper portion of the tank can flow;
    a receiving vessel arranged to receive supernatant liquid exclusively from the second launder; and a lift pump in the receiving vessel arranged to transfer supernatant liquid at a controlled rate exclusively from the second launder to feed stock entering, or present, in the feed well.

8. The thickening tank of claim 7, in which a feedbox is arranged upstream of the feed well and is connected to receive feed stock slurry and supernatant diluting liquid and to mix them together before supplying the mixture to the feed well.

9. The thickening tank of claim 7, in which dilution of the feedstock with supernatant liquid occurs within the feed well.

10. A feed well for fitting to a thickening tank provided with a peripheral overflow launder and comprising:
   a cylindrical casing open at its underside for discharging diluted feedstock downwardly towards a baffle plate spaced beneath the feed well;
   a second launder attached to the outside of the feed well and having a closed underside;
   a cup formed in the underside of the second launder and containing the lower end of a receiving vessel containing a lift pump which operates by drawing supernatant liquid exclusively from the second launder by way of the receiving vessel; and
   means for operating the pump in a controlled manner to pump supernatant liquid from the receiving vessel to feedstock being supplied to it to the feed well.

11. The feed well of claim 10, in which an axially-extending section of the feed well casing provides an inner wall to the second launder.

* * * * *